Aug. 15, 1950 D. C. JANNOPOULO 2,518,694
IMAGE DETECTING PHOTOELECTRIC CONTROL DEVICE
Filed April 28, 1947 4 Sheets-Sheet 1
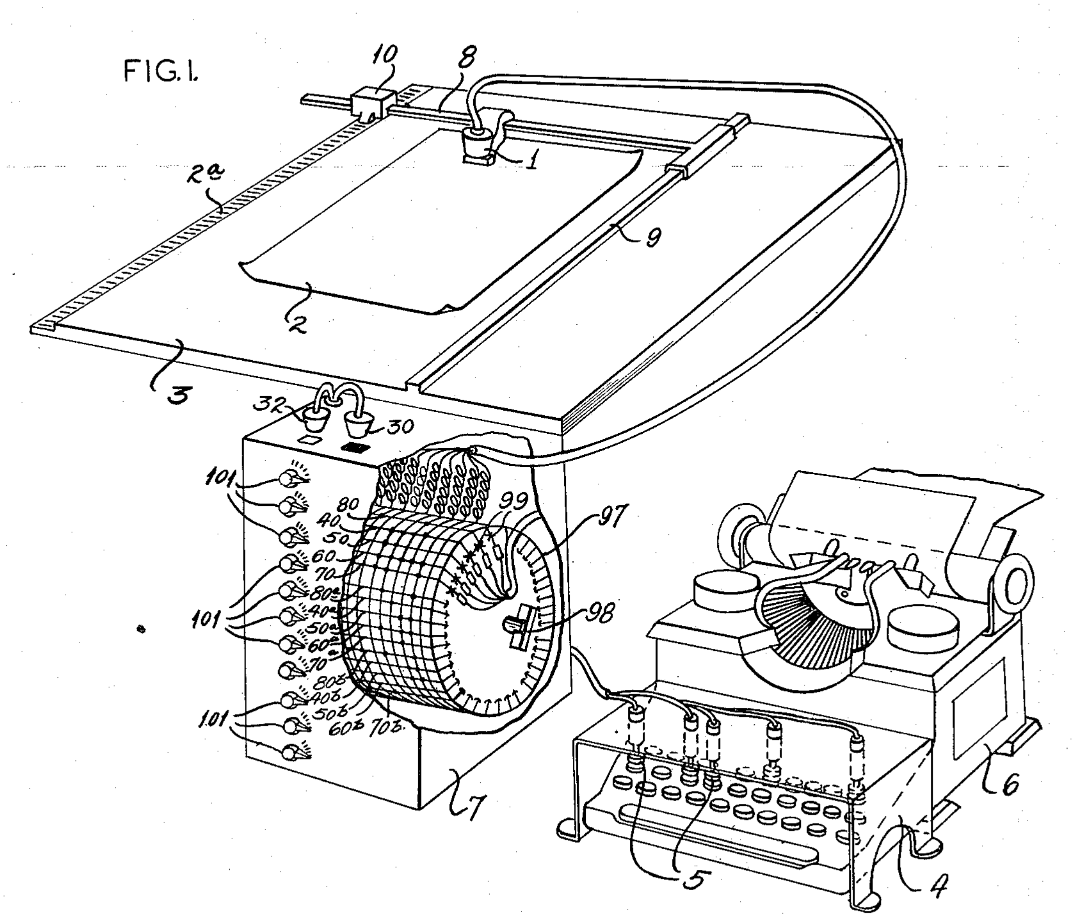
FIG. 1.
FIG. 3.
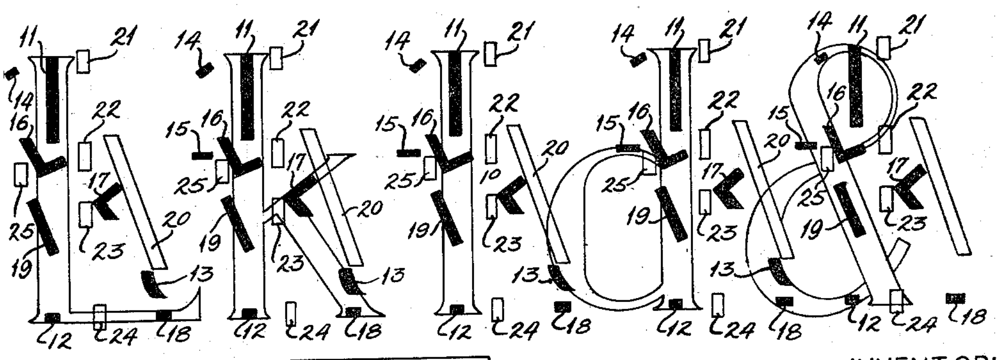
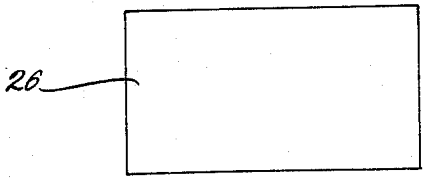
INVENTOR:
DEMOSTHENES C. JANNOPOULO
BY Rodney Bedell
ATTORNEY.

IMAGE DETECTING PHOTOELECTRIC CONTROL DEVICE

Filed April 28, 1947 4 Sheets-Sheet 2

INVENTOR:
DEMOSTHENES C. JANNOPOULO

BY Rodney Bedell
ATTORNEY.

Aug. 15, 1950 D. C. JANNOPOULO 2,518,694

IMAGE DETECTING PHOTOELECTRIC CONTROL DEVICE

Filed April 28, 1947 4 Sheets-Sheet 3

INVENTOR:
DEMOSTHENES C. JANNOPOULO

BY Rodney Bedell
ATTORNEY.

Aug. 15, 1950 D. C. JANNOPOULO 2,518,694

IMAGE DETECTING PHOTOELECTRIC CONTROL DEVICE

Filed April 28, 1947 4 Sheets-Sheet 4

INVENTOR:
DEMOSTHENES C. JANNOPOULO

BY Rodney Bedell
ATTORNEY.

Patented Aug. 15, 1950

2,518,694

UNITED STATES PATENT OFFICE 2,518,694

IMAGE DETECTING PHOTOELECTRIC CONTROL DEVICE

Demosthenes C. Jannopoulo, St. Louis, Mo.

Application April 28, 1947, Serial No. 744,403

18 Claims. (Cl. 250—208)

The invention relates to devices actuated automatically by groups of signals or impulses occurring simultaneously and adapted to selectively operate mechanism in accordance with the signals received.

The main object of the invention is to detect or recognize a wide variety of patterns and to selectively operate control mechanisms in response to the detection of such patterns. The patterns may comprise printed or typewritten letters and numerals, musical notes, pictures, photographs, designs, objects and images of objects, photographic films, spectroscopic light patterns, light patterns on a fluorescent screen, or other patterns in colors, or black and white. In response to the detection of such patterns, the control mechanism may be made to operate a conventional or Braille typewriter, a linotype, a calculating machine, a piano, a phonograph, signal apparatus, telegraph key, or other devices.

More specifically, the device may be used to copy a printed or typewritten text on a conventional typewriter, or Braille typewriter, or on a linotype; to operate a calculating machine from printed or typewritten numerals; to operate keys of a piano-like instrument in response to the detection of musical sound tracks, or in response to printed musical notes on sheet music; to spell words audibly by the selective operation of a plurality of phonograph reproducers, each adapted to pronounce from a record a single letter of the alphabet in response to the detection of that letter; or to pronounce short words in response to the detection of the words as single patterns or to operate control mechanism selectively, such as sounding an alarm or directions, upon the detection of images or pictures of predetermined character.

In general, this invention constitutes a scanning head with a retina-like photocell arrangement coupled with a circuit relay arrangement capable of operating predetermined controls, or combinations of controls, in response to the detection of predetermined combinations of light patterns. The scanning head may be made sensitive to any electromagnetic patterns.

The patterns are detected by photo-sensitive cells arranged in predetermined ways in a scanning head which moves relative to the patterns. When the scanning head is focused on a pattern, a group of the cells, arranged to detect that particular pattern, actuates at least one of a series of control circuits to operate a machine, such as depressing a key of a typewriter corresponding to a detected letter pattern, or operating a phonograph to pronounce the letter detected.

When the scanning head is focused on another pattern, another group of photocells, which may include some of the cells of the first mentioned group, and at least one other cell, actuates another control circuit to further control operation of the machine, such as depressing another key of the typewriter corresponding to the other letter pattern detected. Any number of patterns of any shape may be detected by arranging the photocells in a predetermined way and by providing for each group of cells a machine control circuit actuated by the group when the group detects its pattern.

Other objects and uses will be apparent to one skilled in the art from the following description and accompanying drawings, in which:

Figure 1 is a perspective view of a device constructed according to the invention and adapted to copy printed or typewritten pages on any conventional typewriter.

Figure 3 shows one arrangement of photocells in a scanning head, forming part of the device shown in Figure 1, used to detect printed or typewritten letters of the alphabet.

Figure 2:
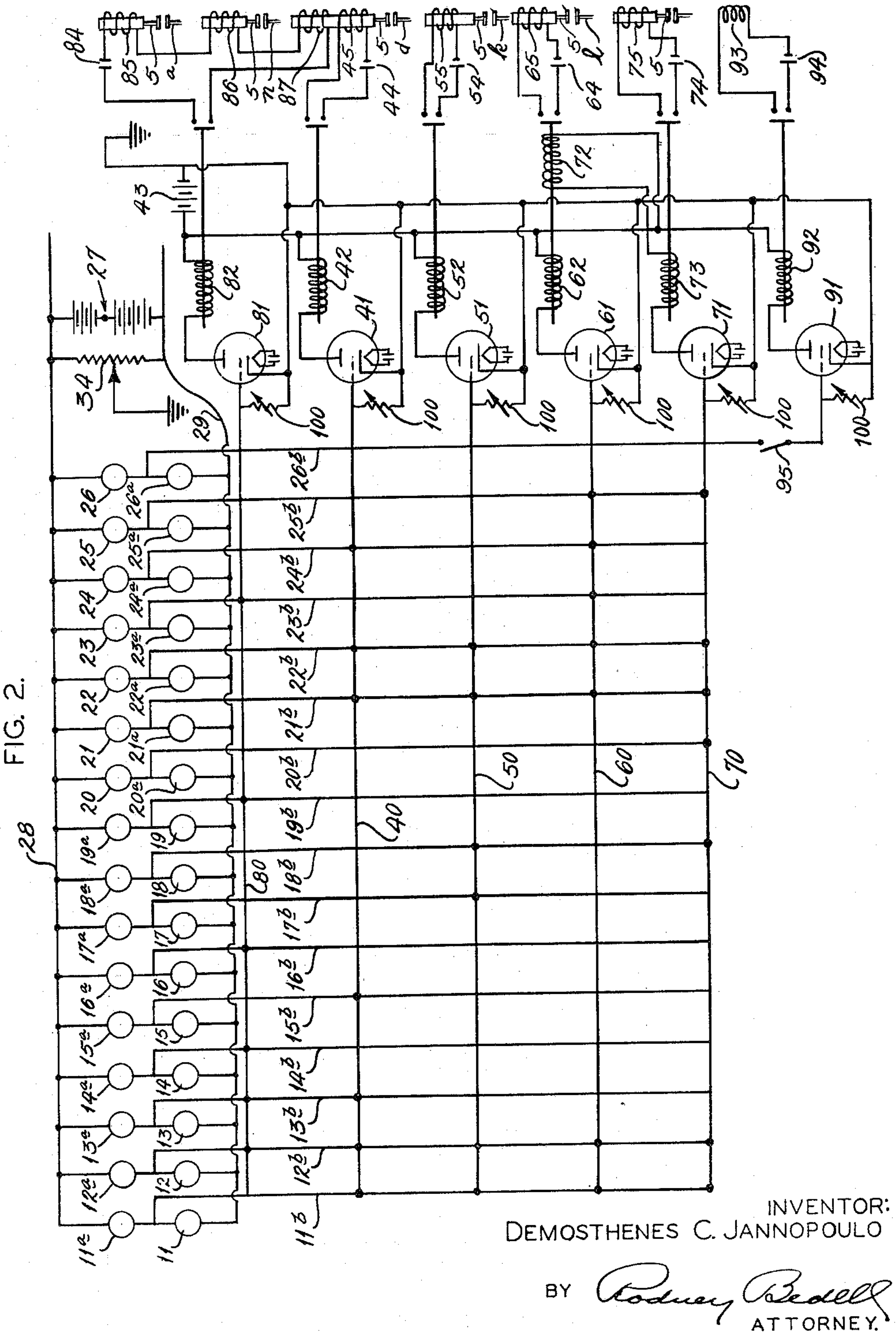
Figure 2 is a schematic diagram showing the electrical circuits used in the device of Figure 1.
Figures 5, 7:
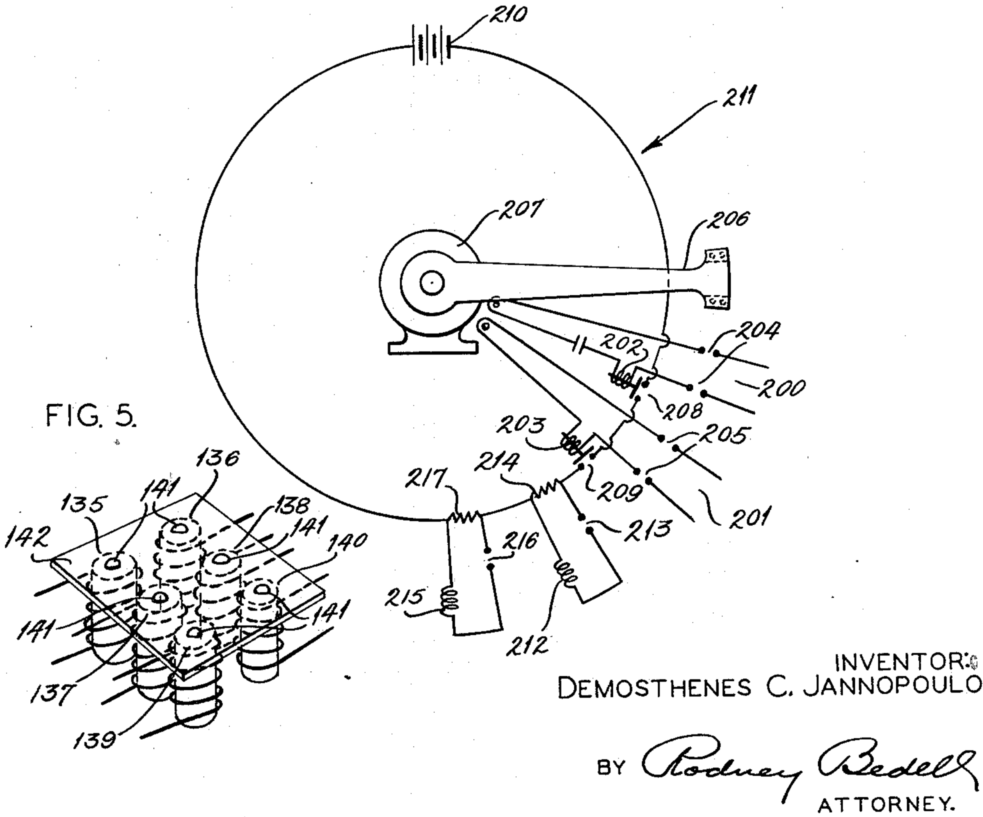
Figure 5 is a detail view showing the operating plungers of Figure 4, adapted to form directly the characters of the Braille alphabet in temporary form.
Figure 6:
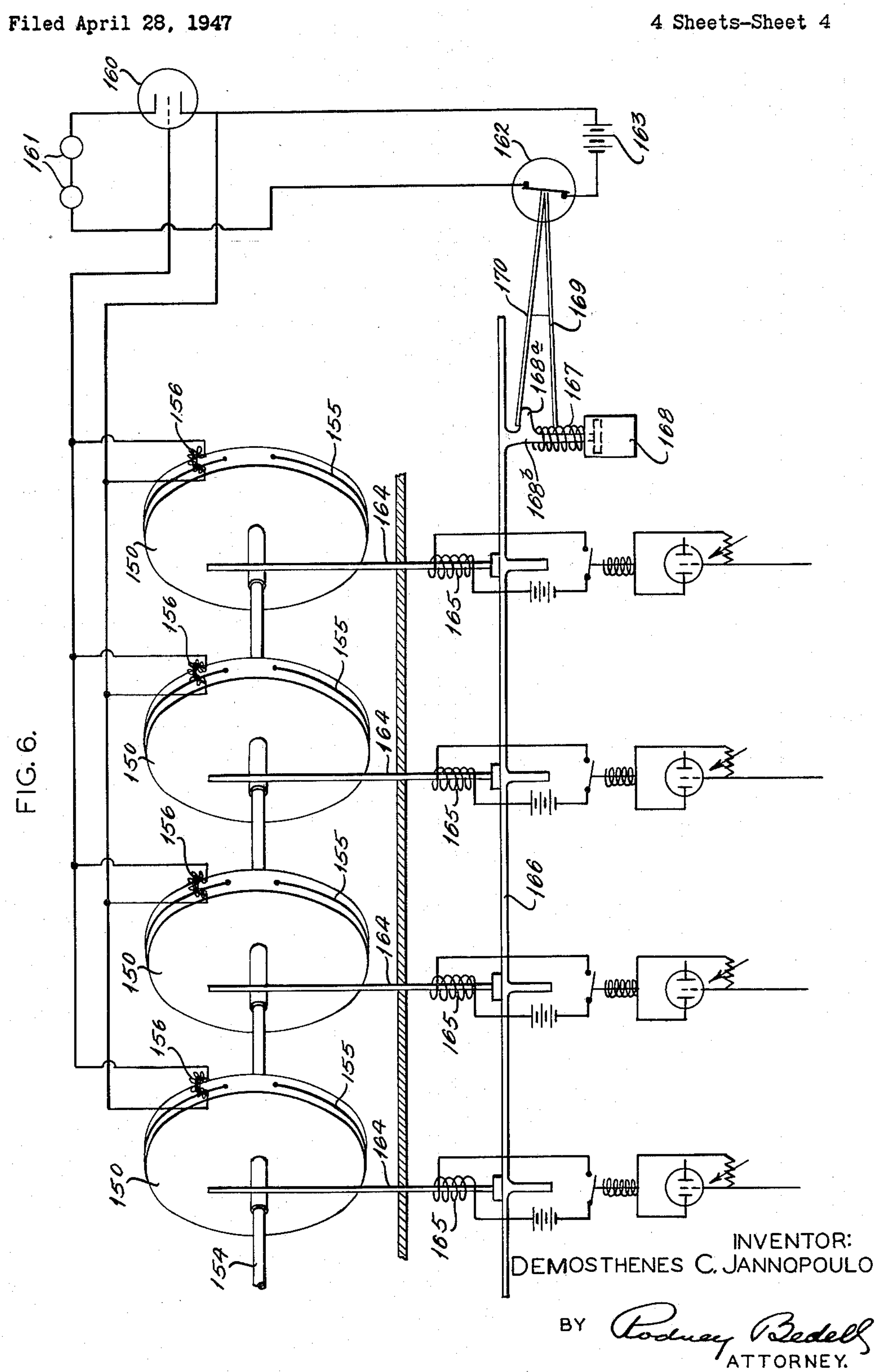

Figure 6 is a schematic diagram showing the device of Figure 1 adapted to selectively operate a series of magnetic wire phonographs to spell words audibly in response to the detection of the letters of the word on a printed or typewritten page, and Figure 7 is a schematic partial wiring diagram showing another modification of the wiring diagram of Figure 2 so the device of Figure 1 may be used to operate the several controls of one or more machines in a predetermined order upon the detection of patterns in a predetermined sequence.

The device shown in Figures 1–3 is adapted specifically for copying printed or typewritten pages on a conventional typewriter, but the basic circuit arrangement shown schematically in Figure 2 may be used for other purposes mentioned above and described in greater detail below.

A scanning head 1 (Figure 1) is moved line by line, either manually or mechanically, from left to right across a printed or typewritten page 2 on table 3. Scanning head 1 preferably is slidable on a bar 8 for movement transversely of page 2 and bar 8 is slidable transversely on a bar 9 rigid with table 3 for movement of scanning head 1 lengthwise of page 2. A block 10 may engage the table at a series of spaced notches 2*a* to guide movement of scanning head 1 from one printed line to the next.

A movable frame 4 supporting a plurality of electrically operated plungers 5 is placed over the keyboard of a typewriter 6 with the plungers in registry with the respective keys. As the scanning head moves across the page, letters of the alphabet are detected one by one by the device, and the corresponding keys of the typewriter are depressed one by one to copy the printed or typewritten page. A box-like housing 7 contains electrical circuits as described below for controlling operation of plungers 5.

By one arrangement scanning head 1 includes a plurality of photo electric cells 11—26 shaped and arranged as shown in Figure 3. Each photocell in the scanning head is focused by a lens or other means on a very small portion of the letter; or the letter may be magnified to any desired size to facilitate its detection by the photocells. In the examples shown, the device detects the letters "L," "*k*," "*l*," "*d*" and the character "&." Each photocell 11—26 (Figure 2) is connected in series with a companion photocell 11*a*—26*a*, respectively, and the pairs of cells are connected in parallel with one another to a power source 27, having a voltage range of +150 volts to −150 volts, by wires 28 and 29. Photocells 11*a*—19*a* and 20—26 are connected to the positive terminal of the power source by wire 28 and photocells 11—19 and 20*a*—26*a* are connected to the negative terminal of the power source by wire 29. Photocells 11*a*—19*a* are contained in a stationary head 30 focused on an illuminated black spot and photocells 20*a*—26*a* are contained in a stationary head 32 focused on an illuminated white spot. Power source 27 is grounded to housing 7 through a potentiometer 34 which, during normal operation, is adjusted approximately at its center so that wire 28 is at a potential relative to the housing of plus approximately 150 volts and wire 29 is at a potential relative to the housing of minue approximately 150 volts.

Photocell circuit connectors 11*b*—26*b* are connected to corresponding pairs of photocells 11—26 and 11*a*—26*a*. As the scanning head is moved across an illuminated page, when photocells 11—19 are focused on a white portion of the page (photocells 11*a*—19*a* are focused on a black spot), connectors 11*b*—19*b* assume a negative potential of approximately minus 50 volts relative to the housing because the resistance to current flow in photocells 11*a*—19*a* is much greater than the resistance to the current flow in photocells 11—19, respectively, and the photocell circuits are unbalanced. When photocells 11—19 are focused on a black spot, connectors 11*b*—19*b* are at approximately zero potential because the resistance to current flow of photocells 11—19 and 11*a*—19*a*, respectively, is approximately equal and the photocell circuits are balanced.

When photocells 20—26 scanning head are focused on a black spot (photocells 20*a*—26*a* are constantly focused on a white spot), connectors 20*b*—26*b* assume a negative potential of minus approximately 50 volts. When photocells 20—25 are focused on a white spot and are balanced with their respective companion photocells, connectors 20*b*—26*b* are at approximately zero potential.

Wires 11*b*, 12*b*, 13*b*, 15*b*, 21*b*, 22*b* and 24*b* are connected by a wire 40 to the grid of a vacuum tube 41 having its plate and cathode connected in series with a normally open relay 42 and a power source 43 having its negative terminal grounded to housing 7. Relay 42 controls an operating circuit including a power source 44 and a solenoid 45 for operating a plunger 5 to depress the "*d*" typewriter key.

Photocells 11, 12, 13, 15, 21, 22 and 24 are arranged in scanning head 1 (Figure 3) so that when the scanning head is focused centrally on the letter "*d*," photocells 11, 12, 13, 15 are focused on a black portion of the letter and photocells 21, 22 and 24 are focused on a white portion of the page. Since the companion photocells are already focused on a white or black spot corresponding to the associated scanning photocell, the resistance to current flow through each of the above companion cells and its associated scanning cell is approximately equal so that the grid potential of tube 41 is approximately zero volts, providing for current flow through the tube plate-cathode circuit to close relay 42 and operate the plunger 5 over the "*d*" key on the typewriter to type the letter "*d*" because negative potential on the tube grid is now changed to zero volts.

Similarly wires 11*b*, 12*b*, 17*b*, 18*b*, 21*b* and 22*b* are connected by a wire 50 to the grid of a vacuum tube 51 having its plate and cathode connected in series with a normally open relay 52 and power source 43. Relay 52 controls an operating circuit including a power source 54 and a solenoid 55 to operate another plunger 5 to depress the "*k*" typewriter key.

Photocells 11, 12, 17, 18, 21 and 22 are arranged in scanning head 1 so that when the scanning head is focused on the letter "*k*," photocells 11, 12, 17 and 18 are focused on a black portion of the letter (similarly to companion photocells 11*a*, 12*a*, 17*a* and 18*a*) and photocells 21 and 22 are focused on a white portion of the page (similarly to companion photocells 21*a* and 22*a*). The grid potential of tube 51 then is approximately zero volts, providing for current flow through the tube plate circuit to close relay 52 and operate the plunger 5 over the "*k*" key on the typewriter.

Similarly wires 11*b*, 12*b*, 21*b*, 22*b*, 23*b*, 24*b* and 25*b* are connected by a wire 60 to the grid of a vacuum tube 61 having its plate and cathode connected in series with a normally open relay 62 and power source 43. Relay 62 controls an operating circuit including a power source 64 and solenoid 65 to operate another plunger 5 to depress the "*l*" typewriter key.

Photocells 11, 12, 21, 22, 23, 24 and 25 are arranged in scanning head 1 so that when the scanning head is focused on the letter "*l*," photocells 11 and 12 are focused on a black portion of the letter (similarly to companion photocells 11*a* and 12*a*) and photocells 21, 22, 23, 24 and 25 are focused on a white portion of the page (similarly to companion photocells 21*a*, 22*a*, 23*a*, 24*a* and 25*a*). The grid potential of tube 61 then is approximately zero volts providing for current flow through the tube to close relay 62 and operate the plunger 5 over the "l" key on the typewriter.

Similarly wires 11b, 12b, 18b, 20b, 21b, 22b and 25b are connected by a wire 70 to the grid of a vacuum tube 71 having its plate and cathode connected in series with normally open relays 72 and 73 and power source 43. Relay 72 operates the contacts of relay 62 and thereby controls the operating circuit which operates plunger 5 to depress the "l" key of the typewriter. Relay 73 controls an operating circuit including a power source 74 and a solenoid 75 to operate a plunger 5 which depresses the shift key on the typewriter.

Photocells 11, 12, 18, 20, 21, 22 and 25 are arranged in scanning head 1 so that when the scanning head is focused on the letter "L," photocells 11, 12 and 18 are focused on a black portion of the letter (similarly to companion photocells 11a, 12a and 18a) and photocells 20, 21, 22 and 25 are focused on a white portion of the page (similarly to companion photocells 20a, 21a, 22a and 25a). The grid potential of tube 71 then becomes approximately zero volts providing for current flow through the tube to close relays 72 and 73 and operate the plungers 5 over the "l" key and over the capital shift key on the typewriter to type the letter "L."

Wires 12b, 13b, 14b, 16b, 19b and 23b are connected by a wire 80 to the grid of a vacuum tube 81 having its plate and cathode connected in series with a normally open relay 82 and power source 43. Relay 82 controls an operating circuit including a power source 84 and time delay solenoids 85, 86, and 87 to operate the plungers 5 which depress "a," "n" and "d" typewriter keys, respectively. The time control on solenoids 85, 86 and 87 provide for operation of the plungers 5 in the sequence *a, n, d*.

Photocells 12, 13, 14, 16, 19 and 23 are arranged in scanning head 1 so that when the scanning head is focused on the character "&," photocells 12, 13, 14, 16 and 19 are focused on a black portion of the character and photocell 23 is focused on a white portion of the page. The grid potential of tube 81 then is approximately zero volts providing for current flow through the tube plate circuit to close relay 82 and operate the plungers 5 over the "a," "n" and "d" keys in that order.

Each letter's image, projected upon the eye of the scanning head, illuminates a predetermined group of cells there. Consider, for example, a black letter on an illuminated white page. In the case where a group of photocells, which would be illuminated by the image of that letter, if scanned, fails to receive the image of that letter, then one or more of the scanning cells in that group, being improperly illuminated for that letter, will cause a negative potential in the respective connected photocell circuits and connected grid conduit, thereby preventing the typing of that letter, because of negative potential on the grid of the electronic tube representing that letter.

The connections between connectors 11b—25b and wires 40, 50, 60, 70, and 80 preferably are made through a dry disc selenium type rectifier, or a coating of rectifying material, as indicated at R, so that current may flow only in a direction from the photocells through connectors 11b—25b into wires 40, 50, 60, 70 and 80 to prevent short circuiting when the connectors are at different potentials (assuming direction of current flow according to the electron theory).

To facilitate properly positioning scanning head 1 in alignment with a line of letters, photocell 26 in the scanning head is focused on the page between the printed or typwritten lines directly below the letter to be reproduced. In Figure 3, photocell 26 is shown only in the position it assumes when the scanning head is positioned over the letter "k". Cell 26 may be incorporated into the lower part of the scanning head. When scanning head 1 is properly positioned in alignment with the line to be scanned, photocells 26 and 26a are balanced in illumination and electrical resistance, because both cells are now receiving white light and wire 26b is at substantially zero volts potential and so provides for current flow through a tube 91 having its plate and cathode connected to a normally closed relay 92 and power source 43. Relay 92, when energized, opens an operating circuit and discontinues the operation of a buzzer 93 in series with a power source 94 and providing an audible signal for the operator to indicate when the scanning head is not properly aligned with a line of letters. Cessation of the buzzing sound indicates the scanning head is aligned properly. A switch 95 in wire 26b may be opened after scanning head 1 is positioned properly. The mechanism described above then may be used to move the scanning head across the page and from line to line after the scanning head is properly aligned with the printed matter manually or mechanically.

In order to close relays selectively, when the image from scanning causes cells in a pair from being electrically balanced less than 100%, the following arrangement may be used: Each tube circuit includes a variable resistance 100 connected from the grid to the cathode to vary the sensitivity of the photocell circuits. Each resistance 100 preferably is adjusted by knob 101 (Figure 1) so that the resistance to current flow of the scanning photocell and its companion photocell must be approximately 95% balanced to actuate an associated photocell circuit. A relay then closes its operating circuit when all the scanning cells controlling that relay are balanced approximately 95%. The scanning head guiding circuit including photocells 26 and 26a need be adjusted only to approximately 80% balance. By this predetermined arrangement of photocells in the scanning head, designs and other images may be detected when they have the same general characteristics but are not exactly alike. Again, the variable resistance shunted across the grid and cathode make it possible for the device to detect patterns whose shapes or light intensities are similar but not identical.

To facilitate use of the device when the letters are of different faces, the device may be provided with a plurality of grid conduit sets connected in predetermined combinations to one long photocell circuit combination arranged so that the desired circuit combination may be moved to operating position when desired. A hollow cylinder 97 is mounted rotatably in housing 7 (Figure 1) and wires 11b—25b extend circumferentially about its surface and wires 40, 50, 60, 70 and 80 extend lengthwise thereof and occupy only a small portion of the cylinder surface. Other sets of grid wires 40a, 50a, 60a, 70a and 80a, 40b, 50b, 60b, 70b and 80b, etc., are positioned parallel to wires 40, 50, 60, 70 and 80 and are connected to photocell circuit wires 11b—25b in combinations other than those described above to detect letters of different faces than those shown in Figure 3. Each set of grid wires is served by a common set of amplifier tubes which may be connected to only one set of grid wires at a time. Sets of grid wires may be moved one at a time into operating position for connection to the amplifying tube grids by rotating cylinder 97 by a knob 98 before letter scanning commences until a set of grid wires is in registry with contacts 99 of the grids of the associated amplifying tubes. Any suitable means may be used to position the cylinder accurately with one of its groups of grid wires in operating position.

For convenience, capital letter grid wires may be positioned on the inner surfaces of a hollow cylinder and lower case letter grid wires may be positioned on the outer surface of the cylinder. If desired, sets of grid wires providing desired circuit arrangements for conditioning the device to recognize letters and symbols in different styles of printing may be connected for operation to the amplifier tubes merely by closing one of a series of switches.

The letters *d*, *k*, *l* and L and the character "&" are given as examples to show the photocell arrangement for detecting these letters and for distinguishing one from the other. Of course, to detect the entire alphabet, additional photocells and combinations will be required.

Figure 4:
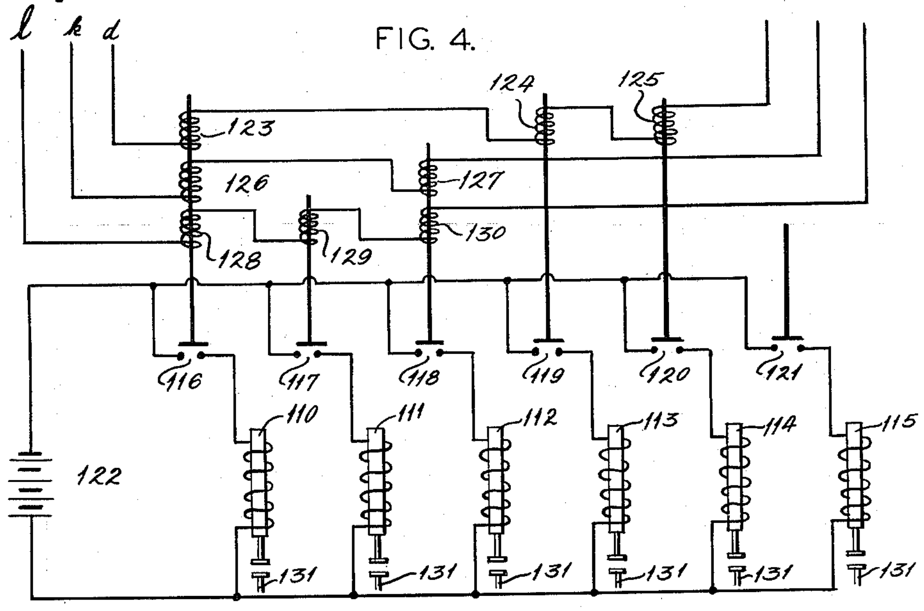
Figure 4 is a schematic partial wiring diagram showing a modification of the wiring diagram of Figure 2 so the device of Figure 1 may be used to operate a Braille typewriter.

The schematic partial wiring diagram in Figure 4 shows a portion of the tube plate circuits at the right hand end of Figure 2 and associated operating circuits for controlling a Braille typewriter. To type Braille characters, it is sometimes necessary to depress several of the Braille typrewriter keys simultaneously and the operating circuits of Figure 2 have been modified in Figure 4 to energize a plurality of solenoids simultaneously to operate a plurality of plungers to depress the keys of the Braille typewriter which print the letter corresponding to the letter detected. For convenience, the operating circuits are designated by their respective letters *d*, *k* and *l* which are to be typed in Braille. Plungers 110—115 are arranged to depress Braille typewriter keys 131 and print the six dots of the Braille cell. Each solenoid of plungers 110—115 is connected in series with a relay contact 116—121, respectively, and the relay contacts and associated plunger solenoids are connected in parallel to a power source 122. The relays are controlled by the operating circuits described above. When the "*d*" operating circuit is energized, relays 123, 124 and 125 are energized and close relay contacts 116, 119 and 120 to operate plungers 110, 113 and 114. When the "*k*" operating circuit is closed, relays 126 and 127 are energized and close relay contacts 116 and 118 to operate plungers 110 and 112. When the "*l*" operating circuit is energized, relays 128, 129 and 130 are energized and close relay contacts 116, 117 and 118 and operate plungers 110, 111 and 112.

In Figure 5, plungers 135—140, corresponding to plungers 110—115 of Figure 4, each have an upwardly extending tit 141 and are positioned in the form of the Braille cell below a tightly stretched elastic membrane 142. The plungers are moved into engagement with membrane 142 and temporarily emboss its surface to form the characters of the Braille alphabet successively when associated solenoids are energized by associated operating circuits, upon the detection of the printed letters as described above. With this arrangement, a blind person may read a printed page by moving the scanning head across the page and by holding one of his fingers on the membrane to feel the detected letters as they are formed one at a time in Braille by plungers 135—140. The plungers may be assembled to the scanning head so a person can feel the Braille characters formed by the plungers with the finger of the same hand with which he moves the scanning head.

In Figure 6 is shown a device for pronouncing letters or characters detected on a printed or typewritten page. The device comprises a series of discs 150 journalled for independent rotation on a shaft 154. Each disc has a circumferential wire 155 on which is recorded magnetically the letter or character to be pronounced. U-shaped magnets 156 are positioned around the wires on discs 150 and are connected in parallel to an amplifying circuit including a vacuum tube 160, a pair of headphones 161, a swtich 162 and a power source 163. When a disc is rotated relative to its associated magnet, a current is induced in the magnet coil and the sound recorded magnetically on the associated wire is reproduced in the headphones by the amplifying circuit.

Each disc is rotated through an angle of approximately 300° by downward longitudinal movement of an associated rod 164 effected by energizing an associated solenoid 165 corresponding to the solenoids described in connection with Figures 1–3 which operate plungers 5 to depress the typewriter keys. Each rod 164 is slowed in its downward movement by an elongated bar 166 which is moved laterally by the rod against the resistance of a dashpot 168 and the tension of a spring 167 on the dash pot plunger 168*b*. Near the lower limit of movement of bar 166, a lug 168*a* on dashpot plunger 168*b* engages an arm 169 and opens switch 162 and the associated amplifying circuit. This prevents sound being emitted from speaker 161 as any disc and associated wire is rotated in a reverse direction to its starting position by upward movement of the associated plunger 164 and bar 166 by spring 167. As the bar 166 nears its uppermost limit, lug 168*a* engages an arm 170 and closes switch 162 and the associated amplifying circuit, so that sound may be emitted in headphones 161 when a disc and associated wire is moved in a forward direction relative to the magnet.

The device may be used to pronounce entire words, each recorded on a separate phonograph wire, when the words are detected as a single pattern by a scanning head containing a large number of photocells. The words may be pronounced in any language irrespective of the language in which they are printed merely by recording the translation of the word on the magnetic wire. In such languages as the Greek, spoken words are formed by the successive pronunciation of the phonetic sounds of the letters comprising the words. With such languages practically all words may be automatically pronounced by this device by the simple method of recording the phonetic sound of each letter upon the phonograph wire instead of its name as described above.

In Figure 7 is shown another modification of the circuit arrangement shown in Figure 2 whereby a plurality of control circuits will be actuated in succession when a series of patterns are detected in proper sequence. The arrangement may further require that the first pattern detected be detected at a specified time. The device may be installed in a plane or rocket and guide the plane or rocket to a target and then release the bombs from the plane or fire the firing head of the rocket. Scanning head 1 may be focused on a radar screen of the plane and the photocells in the scanning head may be arranged to detect predetermined land marks, such as shore lines, rivers or coasts. After the plane has passed over each of these land marks at predetermined time intervals, the device may set the plane controls for a particular course and release the bombs a predetermined time interval after the last objective has been reached. Other uses of the device will be apparent from the following detailed description.

Control circuits 200 and 201 include relays 202 and 203 and spaced contacts 204 and 205, respectively, which are closed by an arm 206 rotated by a motor 207 to operate relays 202 and 203 when the operating circuits 200 and 201 are otherwise closed by the detection of predetermined patterns by the photocell groups as described above. To operate relays 202 and 203, arm 206 must bridge contacts 204 and 205 at the same instant the photocells controlling circuits 200 and 201 detect their predetermined patterns. Relays 202 and 203 include relay contacts 208 and 209, respectively, connected in series with a power source 210 in an operating circuit 211. Operating circuit 211 also includes a relay 212 connected in series with spaced contacts 213. Relay 212 and contacts 213 are connected in parallel to a shunt resistor 214. Operating circuit 211 also includes a relay 215 connected in series with spaced contacts 216. Relay 215 and contacts 216 are connected in parallel to a shunt resistor 217. Contacts 213 and 216 are closed periodically by arm 206. The relationship between relay 212 and shunt resistor 214 and between relay 215 and shunt resistor 217 is such that when contacts 213 and 216 are bridged by arm 206, relays 212 and 215 operate and close a control circuit in the plane or rocket. When the device is used for the purpose described above, relay 212 may operate the plane or rocket controls to guide the plane or rocket to its target after the predetermined radar patterns have been detected by the scanning head. Relay 215 may operate the controls for the bomb release of the plane or firing head of the rocket, after the plane or rocket has reached its target.

The device operates as follows:

When the first radar pattern is detected by the photocell groups at the instant arm 206 bridges contacts 204, relay 202 closes its contacts 208. When the second radar pattern is detected and arm 206 bridges contacts 205, relay 203 closes its contacts 209. Relay contacts 208 and 209, after closing, remain closed until the device has completed a cycle of operation and then are opened automatically in any suitable manner. When arm 206 rotates to a position to bridge contacts 213, relay 212 closes and operates the controls on the plane or rocket to guide the plane or rocket in a predetermined direction. As arm 206 continues to rotate and bridges contacts 216, relay 215 closes and operates the controls for the plane bomb release or rocket firing head. Relays 212 and 215 operate only when relay contacts 208 and 209 are closed. By the detection of predetermined patterns in a predetermined sequence and at specified time intervals, operation of the plane controls and the bomb release is predicated upon the plane passing over particular points at predetermined time intervals. The time interval between detecting patterns and operating the controls may be varied by adjusting the speed of arm 206, or by changing the relative circumferential positions of contacts 204, 205, 213 and 216.

By this circuit arrangement with timing and sequence of images provided for, the device, as described for radar image detection, may also be used for detecting movements of a body, or changes in its condition by the image changes or light intensity changes of various parts of the image, or both as seen by the scanning head.

An arrangement of photocells or phototubes as described may be used to detect patterns made up of radioactive substances, like those used in radiant watch dials, for example. Combinations of radioactive spots may be put on papers, cloths, etc., and the device described will selectively detect the spot combinations without the aid of visible light. Also, heat sensitive thermistor elements may be used in vacuum tubes instead of light sensitive cathodes in photo tubes to selectively detect predetermined heat patterns. Infra-red patterns may be detected by infra-red sensitive phosphors containing zinc sulphide and lead, among other materials.

In addition, ultra-violet rays will activate the common light sensitive photocells; and patterns of these invisible rays may be detected by the device described. The rays may be projected through a stencil onto a scanning head including many photocells.

The photocells shown are specific examples of variable resistances or electrical detectors, and the printed patterns illustrated are specific examples of items which may be detected. The invention may be embodied in other assemblies for detecting items, other than those mentioned, by virtue of their shapes or composition which may influence the variable resistances used as detectors. Also the photocells may be arranged to cover the entire area of the scanning head.

The several embodiments described may be used for the purposes mentioned herein and other uses will be apparent to those skilled in the art by modifying the circuits and arrangement of the photocell groups without departing from the spirit of the invention. Also other details of the invention described and illustrated may be varied without departing from the spirit of the invention and the exclusive use of those modifications coming within the scope of the claims is contemplated.

What is claimed is:

1. In a device of the class described, a plurality of photocells arranged in pairs, each pair comprising an image detecting cell and an associated balancing cell which is subject to constant intensity radiation, a power source, focusing lens, spaced electrical conductors, said pairs and said power source being connected in parallel between said conductors, a group of amplifying tubes each having a filament, a grid and a plate with associated circuits, an electric conduit connecting each grid with predetermined combinations of pairs of photocells by photocell circuits at points between the two photocells of each of the associated pairs, a second power source connected to all plate circuits, the plate circuit of a selected one of said tubes being energized from said second power source when a predetermined electromagnetic pattern is focused upon the image detecting cells of one of said combinations and causes a substantially zero potential on the grid of said tube.

2. In combination with a device as described in claim 1, a rotatable drum, a plurality of grid conduit groups occupying successive positions around the circumference of said drum, each of said grid conduit groups being electrically connected through current rectifiers to a different predetermined group of photocell circuits, there being but one set of photocell circuits common to all of said grid conduit groups, all the grid conduits in one group at a time being brought into electrical contact with the grids of the one group of amplifier tubes common to them all, as said drum is rotated, for selectively detecting letters, numerals and symbols printed in various styles when their images are focused upon the image-detecting photocells.

3. In combination with a device as described in claim 1, a plurality of grid conduit groups, each grid conduit being connected electrically to the grid of an electronic tube, each of said groups being electrically connected to a different prē-determined group of the same set of photocell circuits common to all groups so that said electronic tubes will be selectively energized in response to images of characters in any one of various styles of printing focused upon the image detecting photocells described.

4. In a device of the class described, a power source, a plurality of amplifier tubes each including a filament, a plate and a grid with associated circuits, and a group of photocells and associated circuits connected in parallel with one another and with said power source, each photocell circuit incuding a pair of series-connected photocells and a connector from each pair of photocells extending across and connected in a predetermined combination with said grid circuits, a second power source, said photocell circuits selectively controlling said pate circuits to permit a change in their electrical condition by the second power source by change of potential on the grids of said amplifier tubes in response to the electrical change in predetermined combinations of said photocell circuits in response to the projection of predetermined light patterns upon a part of said combination of said photocells.

5. In a device of the class described, focusing lenses, a plurality of photocells arranged in pairs, each comprising an image detecting cell and an associated balancing cell, part of said balancing cells being exposed normally through said lenses to a relatively light area and part being exposed normally to a relatively dark area, a power source, spaced electrical conductors, said pairs and said power source being connected to said conductors in parallel, a group of electronic amplifier tubes each having filament, grid and plate circuits, an electric conduit connecting the grid circuit to each tube through current rectifiers to predetermined groups of said photocell pairs, a second power source being connected to all tube plate circuits, one of said plate circuits controlling a buzzer through a relay by the action of its associated photocells when all the image detecting photocells of said photocell circuits are focused upon relatively light areas.

6. In a device of the class described, a scanning head with focusing lens and a plurality of image detecting photocells, associated balancing photocells which are subject to constant intensity radiation, each image-detecting cell being paired with a balancing cell, a power source, spaced electrical conductors, a potentiometer, said pairs and said power source and said potentiometer being connected in parallel to said conductors, a group of electronic tubes, each having a filament, a grid, and a plate with associated circuits, an electric conduit connecting each grid through current rectifiers with predetermined combinations of said pairs of photocells at points between the two photocells of each pair, a second power source connected to all plate circuits, solenoids with associated plungers included in said plate circuits, a plurality of independently rotatable members each geared to one of said plungers, and having on its periphery a sound recording corresponding to some printed character and a sound reproducer associated with it to produce the sound corresponding to the printed character when the image of said character is projected upon said image detecting photocells to produce substantially zero potential on the grid of the associated amplifying tube.

7. In a device of the class described, lenses, a plurality of photocells arranged in pairs, each comprising an image detecting cell associated with said lenses, and an associated balancing cell subject to constant intensity illumination, a power source, a potentiometer, spaced electrical conductors, said pairs and said power source and said potentiometer being connected in parallel to said conductors, a group of electronic amplifying tubes, each having a filament, a grid, and a plate with associated circuits, an electric conduit connecting each grid with predetermined groups of said pairs of photocells at points between the two photocells of each pair, a second power source connected to all plate circuits, and shunt circuits each including a variable resistance and connected from a tube filament to a grid of that tube, the plate circuit of a selected one of said tubes being energized from the second power source when a predetermined light pattern is focused upon said image detecting photocells and causes substantially zero potential upon the grid of that tube, the variation of said shunt circuit resistances controlling the sensitivity of the device to light pattern detection.

8. In a device of the class described, a plurality of photocells arranged in pairs, each comprising an image detecting cell and an associated balancing cell subject to constant intensity illumination, focusing lenses associated with said image-detecting cells, a power source, spaced electrical conductors, a variable potentiometer, said pairs and said power source and said potentiometer being connected in parallel to said conductors, a group of amplifying tubes each having a filament, a grid, and a plate with associated circuits, an electric conduit connecting each grid through rectifier material with a predetermined combination of said pairs of photocells at points between the two photocells of each pair, a second power source connected to all plate circuits, relays and operating circuits, some of said relays being included in said plate circuits for controlling said operating circuits, a plurality of time-delay relay controls being included in each of said operating circuits, said time-delay relays being operated, in predetermined sequence from a third power source, when a predetermined light pattern is focused upon the image-detecting photocells.

9. In a device of the class described, a plurality of photocells arranged in pairs each comprising an image-detecting cell and an associated balancing cell subject to constant intensity illumination, focusing lenses associated with said image-detecting cells, a power source, spaced electrical conductors, said pairs and said power source being connected in parallel to said conductors, a group of amplifying tubes each having a filament, a grid, and a plate with associated circuits, operating circuits, relays in said plate circuits controlling said operating circuits, an electric conduit connecting each grid through current rectifying material with predetermined combinations of said pairs of photocells at points between the two photocells of each pair, a second power source connected to all plate circuits, a plurality of said operating circuits having relays controlled by the action of each of said amplifier tubes and associated plate circuit relays, some of said operating circuits being controlled by a plurality of said tubes, each tube being responsive only to a predetermined combination of said photocell circuits upon the detection of a pattern by said combinations.

10. A device of the class described comprising a movable scanning head including a plurality of photocells of distinctive shapes and in predetermined positions relative to each other and having common focusing lenses, a pair of stationary scanning heads, each including a plurality of companion photocells each of which is associated electrically with a photocell in said scanning head, there being a series of control relays and a common source of power, an individual electronic amplifier tube controlling each relay and being connected from its grid to predetermined groups of said photocell pairs, one of said relays being actuated when an associated combination of photocells in the scanning head is focused on areas of light comprising a predetermined image or pattern, the intensity of which areas bear a definite relation to the respective light intensities upon the companion photocells.

11. A device as described in claim 10 which also includes a plurality of operating circuits controlled by said relays, an additional power source for said operating circuits, a frame adapted for placement over an associated machine keyboard, solenoids in said operating circuits and supported by said frame and having corresponding plungers for registry with individual keys of said keyboard, said solenoids actuating corresponding plungers by the additional power source as controlled by said relays.

12. In a device of the class described, a series of relay control mechanisms, a series of amplifier tubes each including a filament, a grid and a plate, plate circuits with relays, a conduit connected to each grid, a power source common to said plate circuits, a pair of spaced electrical conductors, a second power source, a potentiometer, a group of variable resistance units series-connected in pairs, said pairs being connected in parallel with one another and with the second power source and with the potentiometer, one of the variable resistance units of each pair being regulated to a predetermined value, the other unit of each pair being a detecting unit, a series of electrical circuit wires connected one to each pair of variable resistance units at a point between them and extending across and being connected to a predetermined combination of said grid conduits through current rectifiers, said variable resistance detecting units being operable by a conventional scanning device which varies the respective resistances according to the shape or composition characteristics of the scanned item.

13. In a device of the class described, a plurality of photocell circuits each including a pair of photocells connected in series and an extended connector from each of said pairs, one of the photocells in each of the pairs being exposed normally to light of predetermined color and intensity and one of each of the photocells in the other pairs being exposed to darker light, a pair of spaced electrical conductors, a power source, said series connected photocell pairs being connected in parallel with each other and with said power source to said spaced conductors, amplifier tubes each including a filament, a grid and a plate with associated circuits, a plurality of electrical conduits, one of which is connected to the grid of each of said amplifier tubes and extends across and is connected to predetermined groups of said photocell circuit connectors, a plurality of plate circuits connected respectively to the plates of said tubes, a second power source common to all of the plate circuits, plate circuit relays included in said plate circuits, operating circuits with a third power source common to them, a plurality of control relays being included in each of said operating circuits, one of said tubes with plate circuits and associated operating circuits having its electrical state changed when the other photocell in each of said pairs connected to the associated tube grid conduit is exposed to light bearing a predetermined relation, to the light projected upon the first photocell in the pair.

14. A device of the class described comprising a primary head containing focusing lenses and a plurality of photocells, a plurality of stationary heads containing together the same number of photocells as in the primary head, each of said stationary-head photocells being series-connected with a like companion photocell in the primary head, said stationary heads being subjected each to light of a different intensity and color, a power source, a potentiometer and a pair of spaced conductors, said series-connected photocell pairs being connected in parallel with each other and in parallel with said power source and in parallel with the potentiometer to said spaced conductors, a plurality of electronic tubes each including a filament, a grid and a plate with associated circuits, control relays, and a second power source, said control relays being connected to said second power source and included in said tube plate circuits, electrical conduits connected one to the grid of each of said electronic tubes, photocell circuits connected respectively to said photocell pairs, one each of said photocell circuits being connected through a current rectifier to a predetermined group of said grid conduits, said group connections being readily changeable, so that a control relay in each plate circuit is actuated only when a predetermined image is focused upon the photocells in the primary head associated with said tube plate circuit by predetermined electrical connections between said photocells and the grid conduit of said tube.

15. In a device of the class described, focusing lenses, a plurality of photocells arranged in pairs, each comprising an image-detecting cell and an associated balancing cell, said balancing cells being normally exposed to a relatively dark area, a power source, spaced electrical conductors, said pairs and said power source being connected in parallel to said conductors, a group of electronic tubes each having a filament, a grid and a plate with associated circuits, an electric conduit connecting the grid of each tube to predetermined groups of said photocell pairs, a second power source being connected to all tube plate circuits, operating circuits, including relays, a third power source, a plurality of said operating circuits being controlled by each of said tube plate circuits when a predetermined image is focused upon said image-detecting cells.

16. In a device of the class described, a plurality of detectors, a power source, spaced electrical conductors, a potentiometer, said detectors being connected in parallel with one another and with the power source and with the potentiometer to said spaced conductors, amplifier tubes each including filament, grid, and plate circuits, a second power source, connectors each connected to one of said detectors, each of said grid conduits being connected electrically through rectifiers to a predetermined group of said detectors through said connectors, so that said connectors normally receive negative current from the power source in the absence on said detectors of a predetermined phenomenon, relays in the plate circuits of said amplifier tubes being actuated selectively, in response to the reception of said phenomena by a predetermined group of said detectors, to change the potential in said connectors and associated amplifier tube from negative to more positive values.

17. In a device of the class described, a plurality of variable resistances for detecting purposes, a second group of variable resistances for association with a master pattern, each of said detecting resistances being connected in series with a companion resistance in the second group, a power source, a potentiometer, and a pair of spaced electrical conductors, said series-connected variable resistances being connected in parallel with one another and in parallel with said potentiometer and with said power source to said spaced conductors, electronic tubes, each including a filament, a grid and a plate with associated circuits, control relays connected to a second power source, a plurality of said control relays being included in each of said tube plate circuits, electrical conduits each connected to the grid of one of said tubes, circuits each connected to a pair of said resistances and to all of said conduits, so that all of said tube plate circuits are energized by said second power source when the detecting resistances are influenced similarly to the resistances associated with the master pattern.

18. A device of the class described comprising a primary head containing focusing lenses and a plurality of photocells, a stationary head containing focusing lenses and corresponding photocells, each of said stationary-head photocells being series-connected with a companion photocell in the primary head and being subjected to a predetermined color and intensity of illumination, a power source, a potentiometer and a pair of spaced conductors, said series-connected photocell pairs being connected in parallel with each other and with the power source and with the potentiometer to said spaced conductors, an electronic tube including a filament, a grid and a plate with associated circuits, control relays, and a second power source, said control relays being connected to said second power source and included in said tube plate circuit, an electrical conduit connected to the grid of said electronic tube, photocell circuits each connected to a pair of said photocells and to said conduit, so that said control relays are actuated by said second power source when an image is projected upon the photocells of said primary head corresponding to a master image projected upon said stationary head photocells.

DEMOSTHENES C. JANNOPOULO.

REFERENCES CITED

The following references are of record in the file of this patent:

UNITED STATES PATENTS

| Number | Name | Date |
|---|---|---|
| 1,487,115 | McQuarrie | Mar. 18, 1924 |
| 2,026,329 | Tauschek | Dec. 31, 1935 |
| 2,131,911 | Ayres | Oct. 4, 1938 |
| 2,228,782 | Sharples | Jan. 14, 1941 |
| 2,231,186 | Gould | Feb. 11, 1941 |
| 2,294,679 | Maul | Sept. 1, 1942 |

OTHER REFERENCES

Scientific American of March 25, 1916, page 323.